United States Patent [19]

Farrell et al.

[11] Patent Number: 4,536,110
[45] Date of Patent: Aug. 20, 1985

[54] SELF CENTERING QUICK-CHANGE CUTTING TOOL ASSEMBLY

[75] Inventors: W. James Farrell, Kildeer; Werner K. Diehl, Rolling Meadows, both of Ill.

[73] Assignee: Illinois Tool Works Inc., Chicago, Ill.

[21] Appl. No.: 581,170

[22] Filed: Feb. 17, 1984

[51] Int. Cl.³ .......................... B23F 5/20; B23F 21/16
[52] U.S. Cl. ...................................... 409/11; 409/234; 409/236
[58] Field of Search ................ 409/11, 231, 232, 233, 409/234, 236; 407/23; 29/568

[56] References Cited

U.S. PATENT DOCUMENTS

| | | | |
|---|---|---|---|
| 2,089,410 | 8/1937 | Olson | 409/231 X |
| 3,821,844 | 7/1974 | Harman et al. | 29/568 |
| 4,287,659 | 9/1981 | Erhardt et al. | 409/11 |

FOREIGN PATENT DOCUMENTS 1117482  5/1956  France ............................. 409/231

Primary Examiner—Z. R. Bilinsky
Attorney, Agent, or Firm—J. P. O'Brien; T. W. Buckman

[57] ABSTRACT

A tool mounting assembly for a gear hobbing machine is disclosed as being mounted between a drive spindle and an outboard bearing support in axial alignment with said drive spindle. The tool mounting assembly comprises a first coupling unit for detachably connecting one end of a hob in driving engagement with said drive spindle, and a second coupling unit for detachably connecting the other end of said hob to said outboard bearing support. The outboard support unit includes a plunger rotatably mounted in the bearing support and axially movable between a hob coupling position and an unload position, and has a drive means for selectively moving the plunger between said hob coupling and unload positions. The second coupling unit includes a first portion secured to the other end of said hob and a second portion secured to said plunger, and includes axial nesting means for self centering the other end of the hob. The outboard support unit includes a plunger drive means for positioning said plunger at the hob coupling position with sufficient end thrust to maintain the hob concentric with the axis of the drive spindle and to hold the first and second portions of first coupling unit in rigid driving relationship.

11 Claims, 4 Drawing Figures

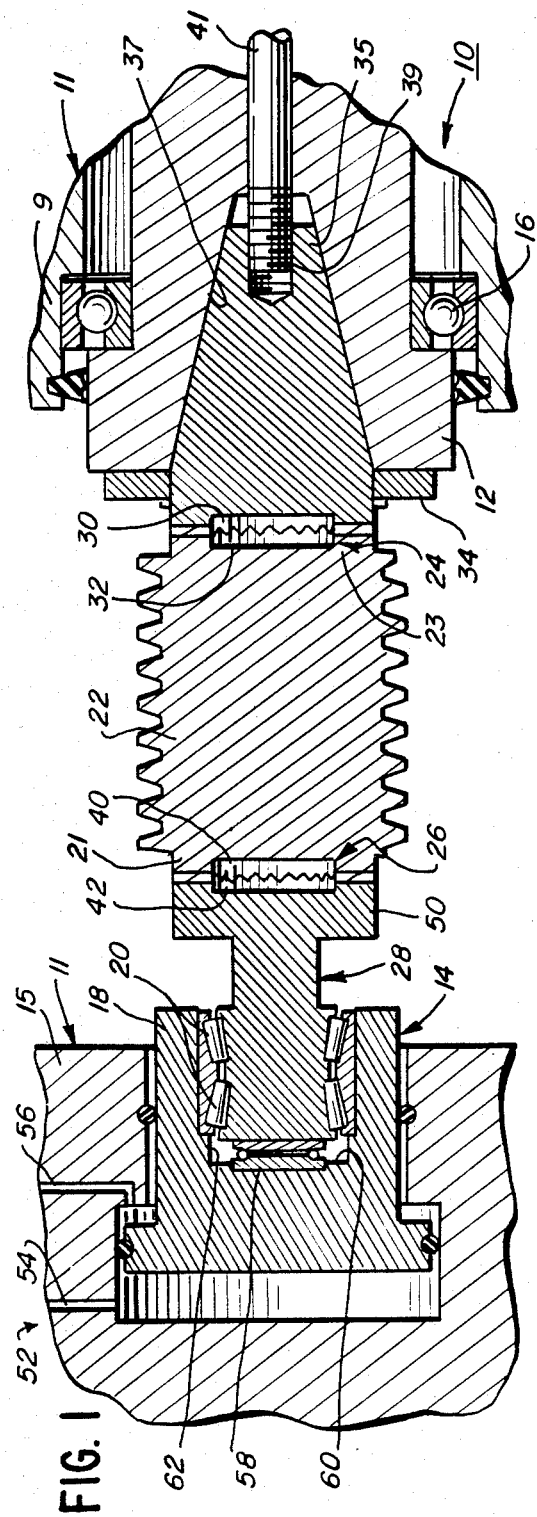
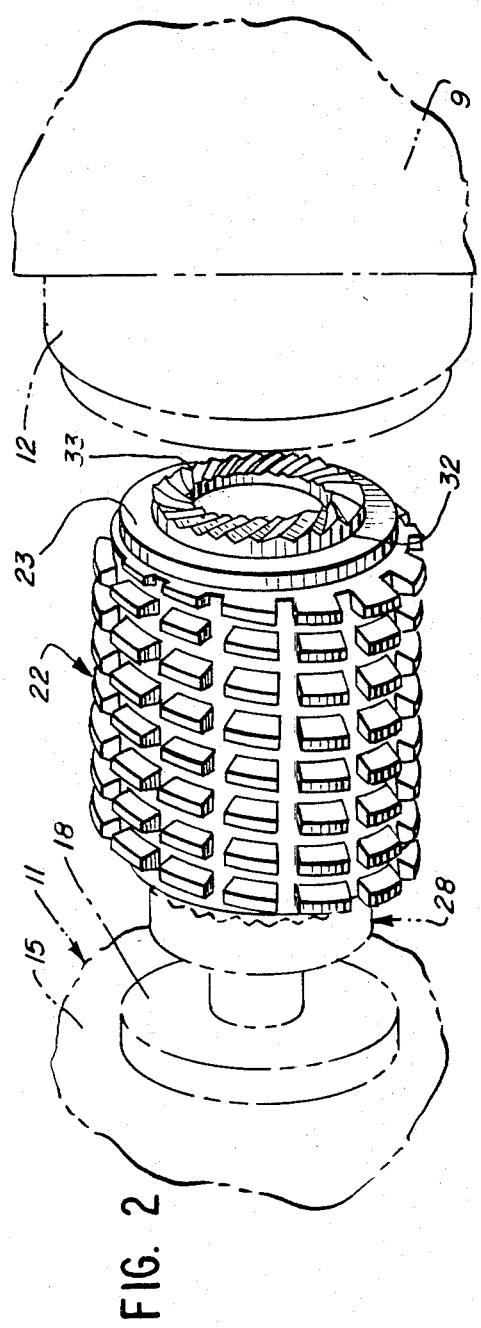
FIG. 1
FIG. 2

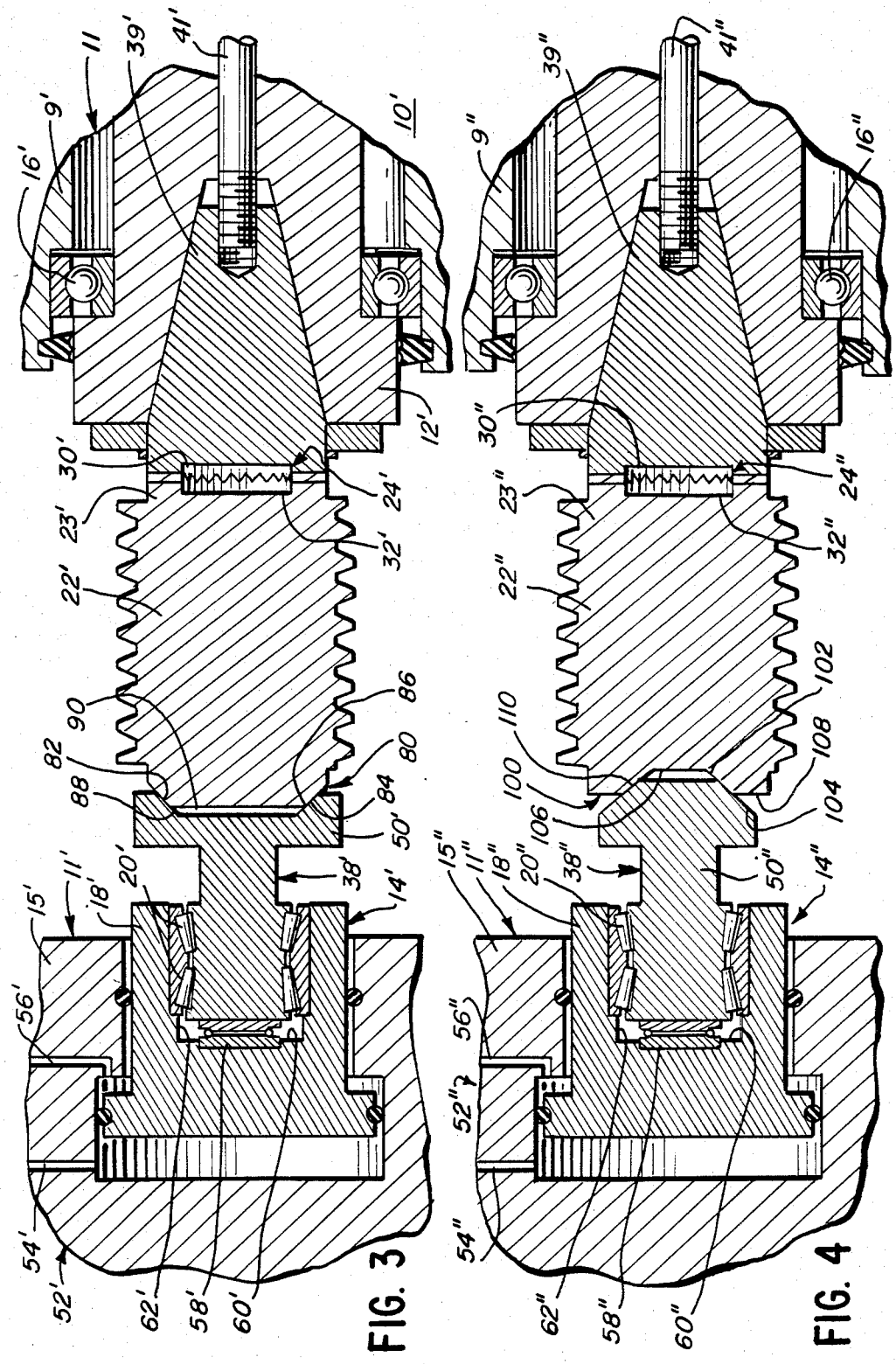

SELF CENTERING QUICK-CHANGE CUTTING TOOL ASSEMBLY

BACKGROUND OF THE INVENTION

Milling cutters and gear hobs are mounted normally in one of two ways. One way is by using an arbor which is precisely fitted on the machine tool and is mated to a precise axial bore in the cutting tool. The other method is to equip the cutter with a shank which fits into a mating bore in the machine. Both of these mounting arrangements must be designed to transmit sufficient torque to overcome the cutting forces and to simultaneously position the cutting tool accurately relative to the workpiece both axially and concentrically.

Each time a milling cutting or hob becomes dull from use, it must be removed from the machine, sharpened and remounted precisely on the machine. The removal and remounting procedure occurs on the average fifteen to twenty times during the useful life of these tools.

This invention is directed to a new and unique system of mounting a hob and milling cutter into a machine. The new mounting arrangement provides for precise concentricity, for transmitting sufficient torque for the cutting operation and most importantly to provide a quicker means to remove and install it on the machine.

SUMMARY OF THE INVENTION

This invention is directed to a mounting system for permitting the quick removal and replacement of a hob or milling cutter on the machine.

One of the improvements of this invention over the prior art is its ability to have automatic removal and replacement of a hob or milling cutter by virtue of the fact that the mounting system is self centering.

This invention utilizes a first coupling unit for detachably connecting one end of the cutting tool in driving engagement with the drive spindle of the machine and a second coupling unit for detachably connecting the other end of the hob to the machine's outboard bearing support. The first coupling unit includes radially disposed means which cooperatively intermesh in a disengageable manner for self centering the one end of the cutting tool which attaches to the drive spindle. The other coupling member is attached to a drive mechanism that moves in the outboard support bearing housing between an unload position and a tool coupling position. In the tool coupling position the second coupling unit includes an axial nesting means for self centering the end of the cutting tool. The drive means has sufficient end thrust force to cause the second coupling member to hold the cutting tool concentric with the axis of the drive spindle during cutting operation.

DESCRIPTION OF THE DRAWINGS

For a better understanding of this invention reference may be made to the accompanying drawings, in which:

FIG. 1 is a cross sectional view of the preferred embodiment of this invention;

FIG. 2 is a perspective view depicting one end of a hob illustrating a coupler member secured to that end;

FIG. 3 is a cross sectional view illustrating a second embodiment of this invention;

FIG. 4 is a cross sectional view illustrating a third embodiment of this invention.

DESCRIPTION OF FIRST EMBODIMENT

There is illustrated in FIG. 1 a partial view of a hobbing machine generally designated by the reference numeral 10 which rotatably supports a hobbing drive spindle 12 on the right hand portion 9 of its head frame structure 11 and an outboard bearing support 14 mounted on the left hand portion 15 of head frame structure 11. The hobbing spindle 12 is rotatably mounted on the bearings 16 and is driven by a motor (not shown) in a manner well known in the art. The head frame structure would include a horizontal member (not shown) that would integrally interconnect the left hand portion 15 and right hand portion 9 of head frame structure 11 such as illustrated in U.S. Pat. No. 4,015,510.

The outboard bearing support 14 includes a bearing support housing 18. The tapered roller bearings 20 are assembled in the housing 18 in a manner to rotatably support the outer end 21 of the hob 22 as will be described in detail herein.

The tool mounting assembly which embodies the principles of this invention comprises a first coupling unit 24, a second coupling unit 26 and an end thrust means 28. The coupler unit 24 consists of two coupling members 30 and 32 which have radially disposed means that cooperatively intermesh in a disengageable manner to self center the inboard end 23 of the hob 22 on the drive spindle 12. Referring to FIG. 2 there is shown the coupler member 32. Coupler member 32 is integrally formed with the hob 22 in a manner to be precisely centered on the axis of the hob 22. A mating coupler member 30 is secured to the end of drive spindle 12 in like manner to provide intermeshing teeth when coupled together that automatically self center the coupler 32 on drive spindle 12.

The particular tooth configuration 33 shown for coupler 32 in FIG. 2 is disclosed in U.S. Pat. No. 4,307,797, which is assigned to the same assignee as this invention. It will be understood that other forms of coupling arrangements are contemplated by this invention, such as directly radially extending teeth. The critical requirement for coupler 24 is to have a pair of mating coupling members which provide a positive driving engagement and are self centering. The expression "radially disposed means" as used in the specification and claims of the application includes any pair of mating coupling members which provides a positive driving engagement and is self centering.

The coupler member 30 must be rigidly attached to the drive spindle 12. One manner of providing this relationship is to bolt the coupler member 30 directly to the end face 34 by means of a plurality of bolts which screw into threaded apertures (not shown) in the end face 34. Alternatively, the coupler member 30 could be integrally formed with the drive spindle or could be attached such as by welding.

Referring to FIG. 1, coupler member 30 is depicted as integrally connected to a tapered shank 35 which seats in frustoconical bore 37 of drive spindle 12. In the distal end of tapered shank 35, there is shown a threaded bore 39 which is fastened to draw bar 41 for axially drawing and retaining the tapered shank 35 relative to the end of spindle 12.

The second coupler member 26 consists of two coupler members 40 and 42 which have means for self centering the outboard end of the hob 22. One suitable coupling means for coupler members 40 and 42 is identical to coupler members 30 and 32 where a plurality of curved radial teeth intermesh in a driving engagement. The coupler members 40 and 42 can be identical to coupler members 30 and 32 of coupler unit 24 or can be any pair of mating couplers having radial disposed means for providing a rigid interfitting relationship.

The coupler members 24 and 26 are positively held together for the hob gear cutting operation by virtue of an end thrust means 28. End thrust means 28 comprises a plunger 50 which is operatively connected to a plunger drive means 52. The plunger drive means 52 is operable as a hydraulic cylinder to displace the plunger 50 between an unload position (not shown) and the hob coupling position illustrated in FIG. 1.

The plunger drive means 52 must have sufficient force to maintain an end thrust on the coupler 26 of a magnitude to keep the hob's rotation in a concentric motion along the axis of the drive spindle 12. Plunger drive means 52 includes extend and retract ports 54 and 56 to extend the plunger 50 to the position illustrated in FIG. 1. Hydraulic fluid under pressure is introduced into the extend port 54 which will drive the plunger 50 to the right as is well known in the art. When it is desired to replace the hob 22, the plunger drive means 52 is actuated to send hydraulic fluid under pressure into retract port 56, and cause the plunger to move to the left a short distance to allow coupler 42 to disengage from coupler 40. It is then possible to remove a worn hob 22 from the first coupler unit 24 and replace it with a sharpened hob. To perform this operation it is necessary that the plunger 50 move a short distance of the order of $\frac{1}{2}$ to $\frac{3}{4}$ of an inch.

When the drive means 52 extends the plunger 50 to the position of FIG. 1 a thrust bearing 58, which is mounted on the end wall 60 of recess 62 in the center of bearing support housing 18, maintains a constant axially directed thrust force to ensure the engagement of first coupler member 24 and second coupler member 26.

As described, plunger drive means provides an end thrust force on second coupler 26 to maintain the hob's concentricity and provides a constant axially directed force on first coupler 24 to clamp the first coupler member 24 and second coupler member 26 in driving engagement. An alternative means of providing the constant axially directed force to clamp first and second coupler member 24, 26 together would be to use a draw bar coupling arrangement which would axially fasten coupler member 32 in a clamping relation with tapered shank 35. An illustration of this alternative means is described in copending U.S. Pat application Ser. No. 420,760, which is assigned to the same assignee as this application.

From the foregoing description of FIGS. 1 and 2 it will be appeciated that a hob 22 may be quickly removed from the gear hobbing machine 10 and replaced by a resharpened hob in a matter of seconds. All that is required is to actuate the plunger drive means 52 in a manner to introduce hydraulic fluid under pressure into retract port 56 with the result that plunger 50 will be driven to the left a short distance. Hob 22 may then be withdrawn from coupler unit 24. A resharpened hob will then be brought into engagement with the drive spindle 12 by the mating coupling action between the coupling member 30 on drive spindle 12 and the coupler member 32 on the inboard end of hob 22. At this point, the plunger drive means 52 is actuated in a direction to drive fluid into extend port 54 causing the plunger 50 to move to the right to cause coupler 42 to engage coupler 40. In this position the two coupler units 24 and 26 are self-centered on the axis of drive spindle 12. As the drive spindle 12 is driven, the thrust bearing 58 will maintain this centered driving relation between the hob 22 and the drive spindle 12.

It will be appreciated that the First Embodiment, which is described with reference to a gear hobbing machine, could be used for other types of cutting tool assemblies, such as a milling cutter machine.

DESCRIPTION OF SECOND EMBODIMENT

The second embodiment illustrated in FIG. 3 is quite similar in structure as the first embodiment of FIG. 1. Like parts of FIG. 3 to those of FIG. 1 will be designated by priming the same reference numeral.

Coupler unit 80 in FIG. 3 differs from the coupler unit 26 in FIG. 1 in that its pair of coupling members 82 and 84 do not have radially extending teeth that intermesh. Coupler 82 comprises an inwardly tapered nose portion 86. The tapered nose portion 86 nests in a frusto-conical recess 88 formed axially about the end wall 90 of plunger 50'. The end thrust forces directed axially through the plunger 50' acts on coupler 80 to hold the hob 22' concentric and to transmit the end thrust needed to keep coupler 80 in engagement.

Other than the differences in coupler 80, FIG. 3 embodiment is identical in construction and operation to that shown and described with reference to FIG. 1.

DESCRIPTION OF THIRD EMBODIMENT

The third embodiment is illustrated in FIG. 4 wherein those parts which are identical to the parts of FIG. 1 are designated by a double prime number.

By comparing FIG. 3 and FIG. 4, it will be appreciated that the third embodiment is constructed with a coupler member 100 which reverses the relationship of its two coupler members 102 and 104 as compared to coupler members 82 and 84 of the third embodiment.

Coupler member 102 comprises a frusto-conical recess 106 formed in the outboard end base 108 of hob 22".

Coupler member 104 comprises a tapered nose portion 110 formed on the outer end of plunger 50".

In the FIG. 4 embodiment sufficient end thrust is transmitted through plunger 50" to hold the nose portion 110 in the frusto-conical recess 106 and thereby hold the hob concentric as the drive spindle 12" is driven.

The removal and replacement of hob 22" for the third embodiment is identically handled in the same manner as described with reference to the first embodiment.

We claim:

1. A tool mounting assembly for a gear hobbing machine or the like having a drive spindle and an outboard bearing support in axial alignment with said drive spindle, said tool mounting assembly comprising a first coupling unit for detachable connecting one end of a hob in driving engagement with said drive spindle, and a second coupling unit for detachable connecting the other end of said hob to said outboard bearing support, said first coupling unit including a first portion secured in driving relation to the distal end of said drive spindle and a second portion secured to the outer end face of said one end of said hob, said first and second portions including radially disposed teeth which cooperatively intermesh in a disengageable manner for self-centering said one end of said hob relative to said drive spindle and an outboard support unit including a plunger rotatably mounted in said bearing support and axially movable between a hob coupling position and an unload position, and said outboard support unit having a drive means for selectively moving said plunger between said hob coupling and unload positions, said second coupling unit including a first portion secured to the other end of said hob and a second portion secured to said plunger, said first and second portions of said second coupling unit including axial nesting means for self centering said other end of said hob, said plunger drive means providing sufficient end thrust on said plunger when in said hob coupling position to maintain said hob concentric with the axis of said drive spindle and to hold said first and second portions of said first coupling unit in rigid driving intermeshing relationship.

2. A combination as set forth in claim 1 wherein said first portion of said first coupling unit is formed integral with said one end of said hob.

3. A combination as set forth in claims 1 or 2 wherein said second portion of said first coupling unit is formed integral with said drive spindle.

4. A combination as set forth in claim 1 wherein said axial nesting means comprises a regular-shaped recess formed axially in said other end of said hob and a tapered nose portion formed on the outer end of said plunger which conforms to said regular-shaped recess to provide a nesting relationship upon said plunger moving to said hob coupling position.

5. A combination as set forth in claim 1 wherein said axial nesting means comprises a tapered nose portion formed on said other end of said hob and a recess formed inwardly of the outer end of said plunger which conforms to the shape of said tapered nose portion to provide a nesting relationship upon said plunger moving to said hob coupling position.

6. A combination as set forth in claim 1 wherein said axial nesting means comprises each of said first and second portion of said second coupling unit having a plurality of radially disposed teeth which cooperatively intermesh in a disengageable manner for self centering said other end of said hob relative to the axis of said drive spindle.

7. A tool mounting assembly for a gear hobbing machine having a drive spindle and an outboard bearing support in axial alignment with said drive spindle, said tool mounting assembly comprising a first coupling unit for detachably connecting one end of a hob in driving engagement with said drive spindle, and a second coupling unit for detachably connecting the other end of said hob to said outboard bearing support, said first coupling unit including a first coupling member secured to the outer distal end of said drive spindle and a second coupling member secured to the outer end face of one end of said hob, said first and second coupling members having a plurality of radially extending teeth which cooperatively intermesh in a disengageable driving relationship to self-center said one end of said hob, and an outboard support unit including a plunger rotatably mounted in said bearing support and axially displaceable between a hob coupling position and unload position said outboard support unit having and a drive means for selectively moving said plunger parallel to the axis of said drive spindle between said hob coupling and said unload positions, said second coupling unit including a first portion secured to the other end of said hob and a second portion secured to said plunger, said first and second portion of said second coupling unit including axial nesting means for self centering said other end of said hob, said plunger drive means providing sufficient end thrust force on said plunger when in said hob coupling position to maintain said hob concentric with the axis of said drive spindle and to hold said first and second members of said first coupling unit in a rigid driving intermeshing relationship.

8. A combination as set forth in claim 7 wherein said first member of said first coupling unit is formed integral with said one end of said hob.

9. A combination as set forth in claims 7 or 8 wherein said second member of said first coupling unit is rigidly fastened to said drive spindle.

10. A combination as set forth in claim 7 wherein said axial nesting means comprises a regular-shaped recess formed axially in said other end of said hob and a tapered nose portion formed on the outer end of said plunger which conforms to said regular-shaped recess to provide a nesting relationship upon said plunger moving to said hob coupling position.

11. A combination as set forth in claim 7 wherein said axial nesting means comprises a tapered nose portion formed on said other end of said hob and a recess formed inwardly of the outer end of said plunger which conforms to the shape of said tapered nose portion to provide a nesting relationship upon said plunger moving to said hob coupling position.

* * * * *